(No Model.) 2 Sheets—Sheet 2.
S. E. HOTCHKISS.
INSECT POWDER DISTRIBUTER.
No. 519,471. Patented May 8, 1894.
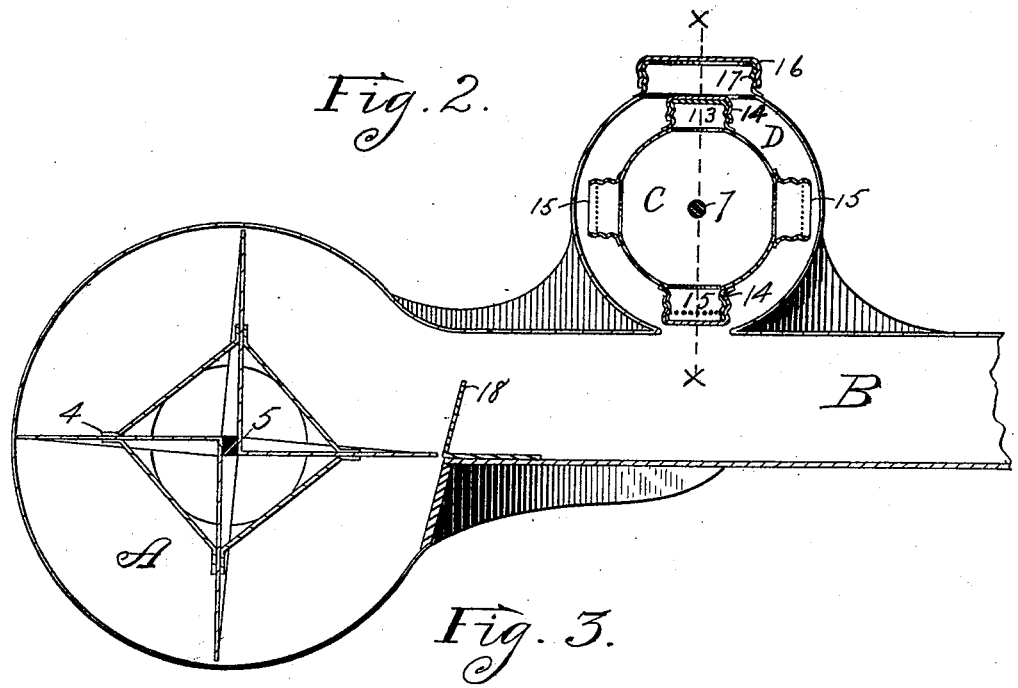
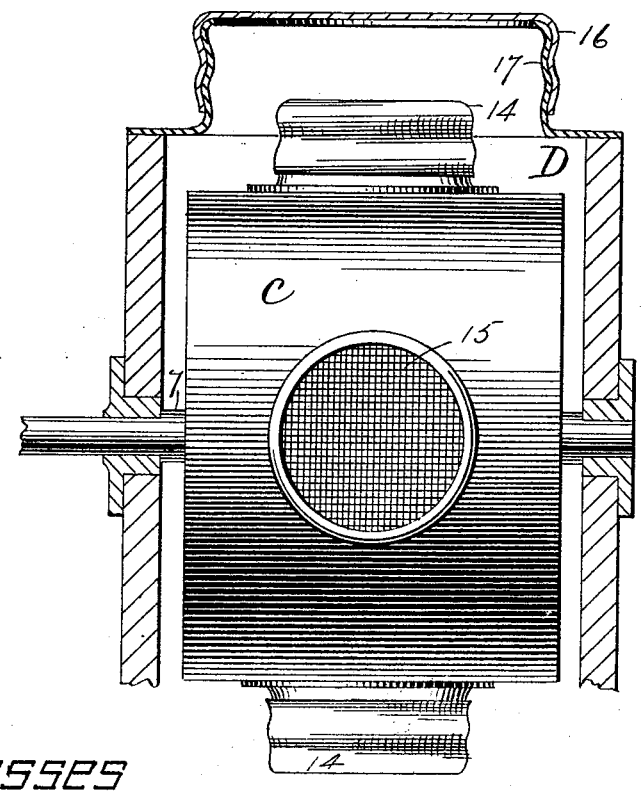
Witnesses
G. H. Stipek
M. E. Rowise
Inventor
Seymour E. Hotchkiss
By James Shepard
Atty.

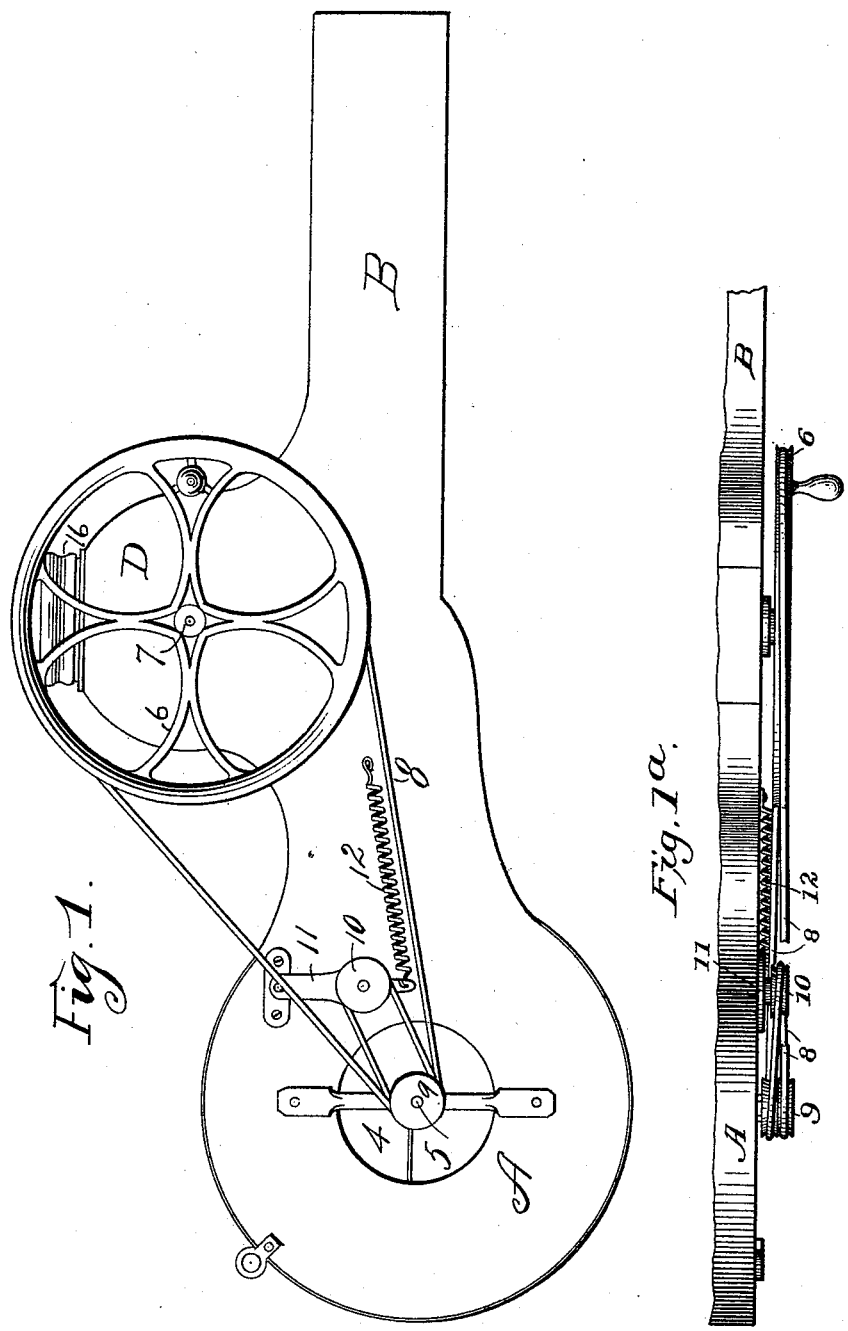

United States Patent Office.

SEYMOUR E. HOTCHKISS, OF WALLINGFORD, CONNECTICUT.

INSECT-POWDER DISTRIBUTER.

SPECIFICATION forming part of Letters Patent No. 519,471, dated May 8, 1894.

Application filed November 16, 1893. Serial No. 491,095. (No model.)

*To all whom it may concern:*

Be it known that I, SEYMOUR E. HOTCHKISS, a citizen of the United States, residing at Wallingford, in the county of New Haven and State of Connecticut, have invented certain new and useful Improvements in Insect-Powder Distributers, of which the following is a specification.

My invention relates to improvements in machines for distributing insect powder, and the objects of my improvement are simplicity and economy in construction and general efficiency and convenience in operation.

In the accompanying drawings: Figure 1 is a side elevation of my insect powder distributer. Fig. 1ª is a plan view of the driving mechanism together with a portion of the case and chute. Fig. 2 is a central longitudinal section of the main portion of the same, and Fig. 3 is a transverse section on the line x x of Fig. 2.

A designates the fan chamber at the large end of the case and B is the air chute which forms the remainder of the case in continuation of the fan chamber. The fan 4 is mounted upon a shaft within the fan chamber and is driven through the wheel 6 on the shaft 7 by means of the belt 8 extending over the double grooved pulley 9 on the shaft 5 and over the pulley 10 which is mounted on the swinging frame 11 and held in position to strain the belt by means of the spring 12 as shown in Figs. 1 and 1ª. The fan and its chamber together with a chute extending therefrom are or may be of ordinary construction and of themselves not of my invention. Any known substitutes may be employed therefor and will constitute an equivalent.

In the body of the case outside of the air blast and above the chute B I form the distributing chamber D and mounted on the shaft 7 within said chamber is a distributing barrel C which revolves with said shaft. I provide the periphery of this barrel with comparative large side openings of which 13 is left free and open for the introduction of the insect powder to the barrel C. I prefer to form around the several openings a screw threaded neck or extension so that the same may be covered and uncovered by means of a screw cap 14. Near the outer end of all the other screw threaded necks or extensions and outside of the periphery of the barrel I form sieves 15 of fine wire cloth, whereby a pocket or extension is formed which projects beyond the periphery of the barrel. The sieves will form a number of very small delivery openings in the outer end of said pockets or extensions. Screw caps 14 are fitted to the extensions to form attachable and detachable covers so as to cover and uncover the sieves when desired. In the drawings I have represented two of said caps in place, while the sieves in the pockets between said two caps are left removed. A space or opening is made in the upper wall of the chute underneath the barrel.

In order to furnish access to the barrel for filling and other purposes, the distributing chamber immediately over the barrel is provided with a cover which may be of any ordinary construction but I prefer to form this cover by means of the screw cap 16 screwed upon the threaded neck 17 as in the screw caps before described, only as the cap is larger. In the base of the chute at its junction with the fan chamber, I form an upwardly turned cross flange 18 to form a pocket for catching whatever powder may not be forced out of the chute by the air blast when the outer end of the chute is pointed upwardly. The barrel C is charged with insect powder and one or more of the attachable and detachable caps removed so as to leave one or more sieves uncovered. The driving wheel B is then turned to revolve the barrel and fan and as the sieves are brought to the under side of the barrel, the powder is sifted through the same, falls down into the chute and is blown out by the air blast. If the material is fed too fast all but one of the sieves may be covered.

I prefer to make two of the sieves of very fine wire cloth, while one or more of the other sieves may be made of a somewhat coarser cloth for feeding coarser powder. While I prefer to offset the sieves to a point outside the periphery of the barrel and believe that thereby they are less liable to clog, the sieves might if desired be placed substantially even with the periphery of the barrel, and it is evident that the pocket forming flange and other parts of my improvement are applicable to insect distributers of other specific construction than that shown. The barrel may be placed in the path of the air blast, but the machine would not then in my judgment be so effective. The case which forms the fan chamber and chute may be formed either of wood or metal, or of wood and metal combined as may be desired.

I claim as my invention—

1. The herein described powder distributer, consisting essentially of a case having the fan chamber and chute, a fan within said fan chamber and a revolving barrel having side openings each one of which is covered with a sieve for sifting the material in a finely powdered condition into the air blast within the chute, substantially as described and for the purpose specified.

2. In an insect distributer, the chute B, revolving barrel C and pocket or offset in the side of said barrel, with a sieve at its outer end for discharging into said chute, substantially as described and for the purpose specified.

3. In an insect distributer, the chute, a revolving barrel having two or more offsets or pockets in the side of said barrel provided with the sieve for discharging into said chute and an attachable and detachable cover for said offsets substantially as described and for the purpose specified.

4. In an insect distributer, a revolving barrel provided with offsets or pockets in the form of screw necks and sieves and screw caps for securing said sieves thereto, substantially as described and for the purpose specified.

5. In an insect distributer having a fan chamber and chute leading therefrom, the cross flange 18 forming a pocket at the junction of said chute and fan chamber, substantially as described and for the purpose specified.

6. The combination of the fan chamber and chute in continuation thereof, said chute being provided with an inclosing wall on its upper side, the distributing chamber D above said upper wall and having an opening or space leading from the bottom of said distributing chamber into said chute, the distributing barrel mounted in said distributing chamber and means for creating an air blast through said chute and at the same time revolving said barrel, substantially as described and for the purpose specified.

7. The combination of the fan chamber and chute forming the case, the shaft, a driving wheel without the chute and the distributing barrel discharging into the chute, the fan and its shaft 5 having the double grooved pulley 9, the pulley 10, the swinging frame 11 upon which it is mounted, the spring 12 and the belt 8, substantially as described and for the purpose specified.

Dated Wallingford, November 13, 1893.

SEYMOUR E. HOTCHKISS.

Witnesses:
C. A. HARRISON,
T. C. SLATE.